US012200081B2

(12) United States Patent
Seguin et al.

(10) Patent No.: US 12,200,081 B2
(45) Date of Patent: *Jan. 14, 2025

(54) SUPPORT FOR MULTI-TYPE USERS IN A SINGLE-TYPE COMPUTING SYSTEM

(71) Applicant: ServiceNow, Inc., Santa Clara, CA (US)

(72) Inventors: Vincent Seguin, San Diego, CA (US); Patrick Casey, San Diego, CA (US); David Schumann, San Diego, CA (US); Szu-hsuan Lee, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,481

(22) Filed: Oct. 27, 2022

(65) Prior Publication Data
US 2023/0050683 A1 Feb. 16, 2023

Related U.S. Application Data

(63) Continuation of application No. 17/397,480, filed on Aug. 9, 2021, now Pat. No. 11,516,307.

(51) Int. Cl.
G06F 15/16 (2006.01)
G06F 21/62 (2013.01)
(Continued)

(52) U.S. Cl.
CPC ........ H04L 67/561 (2022.05); G06F 21/6218 (2013.01); H04L 67/306 (2013.01);
(Continued)

(58) Field of Classification Search
CPC .............. H04L 67/561; H04L 67/564; G06F 21/6218; G06F 2221/2113; G06F 2221/2141
(Continued)

(56) References Cited

U.S. PATENT DOCUMENTS 4,941,084 A 7/1990 Terada et al.
5,185,860 A 2/1993 Wu
(Continued)

FOREIGN PATENT DOCUMENTS

CN 112395370 B 3/2024
EP 0433979 6/1991
(Continued)

OTHER PUBLICATIONS

International Search Report and Written Opinion, PCT Application PCT/US2022/030508, mailed Sep. 8, 2022.

Primary Examiner — Bharat Barot
(74) Attorney, Agent, or Firm — MCDONNELL BOEHNEN HULBERT & BERGHOFF LLP

(57) ABSTRACT

Persistent storage contains a parent table and one or more child tables, the parent table containing: a class field specifying types, and one or more filter fields. One or more processors may: receive a first request to read first information of a first type for a first entity; determine that, in a first entry of the parent table for the first entity, the first type is specified in the class field; obtain the first information from a child table associated with the first type; receive a second request to read second information of a second type for a second entity; determine that, in a second entry of the parent table for the second entity, the second type is indicated as present by a filter field that is associated with the second type; and obtain the second information from a set of additional fields in the second entry.

18 Claims, 13 Drawing Sheets

(51) Int. Cl.
*H04L 67/306* (2022.01)
*H04L 67/561* (2022.01)
*H04L 67/564* (2022.01)

(52) U.S. Cl.
CPC .... *H04L 67/564* (2022.05); *G06F 2221/2113* (2013.01); *G06F 2221/2141* (2013.01)

(58) Field of Classification Search
USPC ................................. 709/202–203, 217–219
See application file for complete search history.

(56) References Cited

U.S. PATENT DOCUMENTS

| | | | |
|---|---|---|---|
| 5,237,518 | A | 8/1993 | Sztipanovits et al. |
| 5,261,097 | A | 11/1993 | Saxon |
| 5,265,252 | A | 11/1993 | Rawson, III et al. |
| 5,367,685 | A | 11/1994 | Gosling |
| 5,390,297 | A | 2/1995 | Barber et al. |
| 5,442,791 | A | 8/1995 | Wrabetz et al. |
| 5,452,415 | A | 9/1995 | Hotka |
| 5,522,042 | A | 5/1996 | Fee et al. |
| 5,533,116 | A | 7/1996 | Vesterinen |
| 5,655,081 | A | 8/1997 | Bonnell et al. |
| 5,659,736 | A | 8/1997 | Hasegawa et al. |
| 5,671,412 | A | 9/1997 | Christiano |
| 5,696,701 | A | 12/1997 | Burgess et al. |
| 5,715,463 | A | 2/1998 | Merkin |
| 5,745,879 | A | 4/1998 | Wyman |
| 5,761,502 | A | 6/1998 | Jacobs |
| 5,764,913 | A | 6/1998 | Jancke et al. |
| 5,778,370 | A | 7/1998 | Emerson |
| 5,887,139 | A | 3/1999 | Madison, Jr. et al. |
| 5,909,217 | A | 6/1999 | Bereiter |
| 5,937,165 | A | 8/1999 | Schwaller et al. |
| 5,949,976 | A | 9/1999 | Chappelle |
| 5,978,594 | A | 11/1999 | Bonnell et al. |
| 6,021,437 | A | 2/2000 | Chen et al. |
| 6,041,347 | A | 3/2000 | Harsham et al. |
| 6,088,717 | A | 7/2000 | Reed et al. |
| 6,101,500 | A | 8/2000 | Lau |
| 6,128,016 | A | 10/2000 | Coelho et al. |
| 6,131,118 | A | 10/2000 | Stupek, Jr. et al. |
| 6,134,581 | A | 10/2000 | Ismael et al. |
| 6,138,122 | A | 10/2000 | Smith et al. |
| 6,148,335 | A | 11/2000 | Haggard et al. |
| 6,166,732 | A | 12/2000 | Mitchell et al. |
| 6,167,448 | A | 12/2000 | Hemphill et al. |
| 6,175,866 | B1 | 1/2001 | Holloway et al. |
| 6,175,878 | B1 | 1/2001 | Seaman et al. |
| 6,260,050 | B1 | 7/2001 | Yost et al. |
| 6,263,457 | B1 | 7/2001 | Anderson et al. |
| 6,272,150 | B1 | 8/2001 | Hrastar et al. |
| 6,336,138 | B1 | 1/2002 | Caswell et al. |
| 6,363,421 | B2 | 3/2002 | Barker et al. |
| 6,393,386 | B1 | 5/2002 | Zager et al. |
| 6,397,245 | B1 | 5/2002 | Johnson, II et al. |
| 6,434,626 | B1 | 8/2002 | Prakash et al. |
| 6,438,592 | B1 | 8/2002 | Killian |
| 6,456,306 | B1 | 9/2002 | Chin et al. |
| 6,466,932 | B1 | 10/2002 | Dennis et al. |
| 6,487,590 | B1 | 11/2002 | Foley et al. |
| 6,505,248 | B1 | 1/2003 | Casper et al. |
| 6,526,442 | B1 | 2/2003 | Stupek, Jr. et al. |
| 6,621,823 | B1 | 9/2003 | Mellquist et al. |
| 6,707,795 | B1 | 3/2004 | Noorhosseini et al. |
| 6,742,015 | B1 | 5/2004 | Bowman-Amuah |
| 6,763,380 | B1 | 7/2004 | Mayton et al. |
| 6,816,898 | B1 | 11/2004 | Scarpelli et al. |
| 6,895,586 | B1 | 5/2005 | Brasher et al. |
| 6,948,175 | B1 | 9/2005 | Fong et al. |
| 6,985,901 | B1 | 1/2006 | Sachse et al. |
| 7,003,564 | B2 | 2/2006 | Greuel et al. |
| 7,028,228 | B1 | 4/2006 | Lovy et al. |
| 7,043,537 | B1 | 5/2006 | Pratt |
| 7,043,661 | B2 | 5/2006 | Valadarsky et al. |
| 7,062,683 | B2 | 6/2006 | Warpenburg et al. |
| 7,096,459 | B2 | 8/2006 | Keller et al. |
| 7,146,574 | B2 | 12/2006 | Goldthwaite et al. |
| 7,197,466 | B1 | 3/2007 | Peterson et al. |
| 7,215,360 | B2 | 5/2007 | Gupta |
| 7,216,304 | B1 | 5/2007 | Gourdol et al. |
| 7,222,147 | B1 | 5/2007 | Black et al. |
| 7,281,170 | B2 | 10/2007 | Taylor et al. |
| 7,412,502 | B2 | 8/2008 | Fearn et al. |
| 7,505,872 | B2 | 3/2009 | Keller et al. |
| 7,593,013 | B2 | 9/2009 | Agutter et al. |
| 7,596,716 | B2 | 9/2009 | Frost et al. |
| 7,617,073 | B2 | 11/2009 | Trinon et al. |
| 7,660,731 | B2 | 2/2010 | Chaddha et al. |
| 7,676,294 | B2 | 3/2010 | Baier et al. |
| 7,676,437 | B2 | 3/2010 | Satkunanathan et al. |
| 7,840,490 | B1 | 11/2010 | Sellers et al. |
| 7,877,783 | B1 | 1/2011 | Cline et al. |
| 7,890,869 | B1 | 2/2011 | Mayer et al. |
| 7,966,398 | B2 | 6/2011 | Wiles, Jr. |
| 8,060,396 | B1 | 11/2011 | Bessler et al. |
| 8,196,210 | B2 | 6/2012 | Sterin |
| 8,321,948 | B2 | 11/2012 | Robinson et al. |
| 8,407,669 | B2 | 3/2013 | Yee et al. |
| 8,554,750 | B2 | 10/2013 | Rangarajan et al. |
| 8,595,647 | B2 | 11/2013 | Sabin et al. |
| 8,620,818 | B2 | 12/2013 | Hughes et al. |
| 8,646,093 | B2 | 2/2014 | Myers et al. |
| 8,674,992 | B2 | 3/2014 | Poston et al. |
| 8,725,647 | B2 | 5/2014 | Disciascio et al. |
| 8,825,678 | B2 | 9/2014 | Potapov et al. |
| 9,053,460 | B2 | 6/2015 | Gilbert et al. |
| 10,673,963 | B1 | 6/2020 | Feiguine et al. |
| 10,749,943 | B1 | 8/2020 | Feiguine et al. |
| 10,771,344 | B2 | 9/2020 | Bitterfeld et al. |
| 10,824,650 | B2 | 11/2020 | Bar Oz et al. |
| 10,944,654 | B2 | 3/2021 | Rimar et al. |
| 11,089,115 | B2 | 8/2021 | Garty et al. |
| 11,095,506 | B1 | 8/2021 | Erblat et al. |
| 11,516,307 | B1* | 11/2022 | Seguin ................ G06F 21/6218 |
| 2002/0116340 | A1 | 8/2002 | Hellberg et al. |
| 2002/0133584 | A1 | 9/2002 | Greuel et al. |
| 2002/0158969 | A1 | 10/2002 | Gupta |
| 2003/0118087 | A1 | 6/2003 | Goldthwaite et al. |
| 2003/0200293 | A1 | 10/2003 | Fearn et al. |
| 2005/0015217 | A1 | 1/2005 | Weidl et al. |
| 2005/0091356 | A1 | 4/2005 | Izzo |
| 2006/0026453 | A1 | 2/2006 | Frost et al. |
| 2006/0095461 | A1 | 5/2006 | Raymond |
| 2006/0179058 | A1 | 8/2006 | Bram et al. |
| 2006/0293942 | A1 | 12/2006 | Chaddha et al. |
| 2007/0033279 | A1 | 2/2007 | Battat et al. |
| 2007/0188494 | A1 | 8/2007 | Agutter et al. |
| 2007/0288389 | A1 | 12/2007 | Vaughan et al. |
| 2008/0052291 | A1 | 2/2008 | Bender |
| 2008/0133289 | A1 | 6/2008 | Armour et al. |
| 2008/0148253 | A1 | 6/2008 | Badwe et al. |
| 2008/0319779 | A1 | 12/2008 | Hughes et al. |
| 2009/0088875 | A1 | 4/2009 | Baier et al. |
| 2009/0097062 | A1* | 4/2009 | Hayashi ................ G06F 3/1238 358/1.15 |
| 2009/0228984 | A1 | 9/2009 | Sterin |
| 2010/0110932 | A1 | 5/2010 | Doran et al. |
| 2012/0323937 | A1 | 12/2012 | Modi et al. |
| 2015/0098471 | A1* | 4/2015 | Stokking ............. H04L 61/2567 370/392 |
| 2015/0142733 | A1 | 5/2015 | Shadmon |
| 2015/0373149 | A1* | 12/2015 | Lyons .................... H04L 67/12 709/203 |
| 2016/0371002 | A1* | 12/2016 | Bahali .................. G06F 3/0659 |
| 2018/0123940 | A1 | 5/2018 | Rimar et al. |
| 2018/0314639 | A1 | 11/2018 | Wilde et al. |
| 2019/0104398 | A1 | 4/2019 | Owen et al. |
| 2019/0121817 | A1 | 4/2019 | Davidson |
| 2020/0050689 | A1 | 2/2020 | Tal et al. |
| 2020/0204443 | A1 | 6/2020 | Bar Oz et al. |
| 2020/0394164 | A1 | 12/2020 | Apte et al. |
| 2021/0182271 | A1 | 6/2021 | Pula |

(56) References Cited

U.S. PATENT DOCUMENTS

2021/0194764 A1 6/2021 Badyan et al.
2021/0209305 A1 7/2021 Machado
2022/0029886 A1 1/2022 Hameiri et al.

FOREIGN PATENT DOCUMENTS

| EP | 1607824 | 12/2005 |
| WO | WO 99/34285 | 7/1999 |
| WO | WO 00/52559 | 9/2000 |
| WO | WO 01/79970 | 10/2001 |

* cited by examiner

| | | USER TABLE 702 | | | | | |
|---|---|---|---|---|---|---|---|
| ID | NAME | EMAIL | CUSTOMER FILTER | VENDOR FILTER | CITIZEN FILTER | CUSTOMER ACCOUNT | VENDOR NAME | GOVERNMENT NUMBER |
| 00001 | JAN SMITH | JS@ABC.COM | YES | NO | YES | 2021-0423 | N/A | 111112 |
| 00002 | ROB JONES | RJ@DEF.COM | NO | YES | NO | N/A | VENDCO | N/A |

SUPPORT FOR MULTI-TYPE USERS IN A SINGLE-TYPE COMPUTING SYSTEM

CROSS-REFERENCE TO RELATED APPLICATION

This application is a continuation of and claims priority to U.S. patent application Ser. No. 17/397,480, filed Aug. 9, 2021, which is hereby incorporated by reference in its entirety.

BACKGROUND

A traditional arrangement for data objects stored in a remote network management platform or another form of cloud-based platform is by the types of these data objects. In particular, userids of users that are allowed to log into and or otherwise access or use the platform may be categorized into type (e.g., customer, vendor, or citizen). Such userids may be represented in database tables, with at least some data for each type of user represented in a table dedicated to that type.

In these environments, the type of the user may be utilized to determine capabilities and features accessible to the user by way of the platform, such as permissions to access certain data or use certain applications, the information that the user is presented with on a graphical user interface when the user logs in, and so on. Further, standard and custom software applications on the platform may be written based on the format of such tables and the notion that each user has a single type. Thus, the single-type user may be a fundamental aspect of the platform.

To this point, in order to support a user with multiple types, the platform may be configured with different userids (one for each type) for that user. Doing so is inefficient, as it wastes storage capacity with additional records per user. It also requires that multi-typed users remember multiple passwords and switch between these userids in order to access their full sets of capabilities.

SUMMARY

The implementations described herein overcome the limitations of this traditional design (and possibly other limitations as well) by providing backwards-compatible support for multi-typed users. Particularly, these implementations allow at least some existing software applications to continue operating under the assumption of single-typed users, while allowing other software applications to support multi-typed users. This is accomplished by simultaneously supporting definitions of user types in dedicated tables as well as in metadata stored in a parent user table. As a consequence, the remote network management platform (or other type of platform) saves storage capacity and provides a user experience that is more intuitive and less burdensome on users.

Accordingly, a first example embodiment may involve receiving a first request to read, from persistent storage, first type-specific information of a first type for a first entity, wherein the persistent storage contains a parent table and one or more child tables, wherein the parent table contains: (i) a class field specifying types, and (ii) one or more type-specific filter fields, wherein the types are respectively associated with different tables from the one or more child tables, and wherein the one or more type-specific filter fields are respectively associated with one or more of the types. The first example embodiment may also involve determining that, in a first entry of the parent table for the first entity, the first type is specified in the class field. The first example embodiment may also involve obtaining the first type-specific information from a particular child table of the one or more child tables, wherein the particular child table is associated with the first type. The first example embodiment may also involve providing the first type-specific information in response to the first request. The first example embodiment may also involve receiving a second request to read, from the persistent storage, second type-specific information of a second type for a second entity. The first example embodiment may also involve determining that, in a second entry of the parent table for the second entity, the second type is indicated as present by a particular type-specific filter field that is associated with the second type. The first example embodiment may also involve obtaining the second type-specific information from a set of additional fields in the second entry of the parent table, wherein the set of additional fields is associated with the particular type-specific filter field. The first example embodiment may also involve providing the second type-specific information in response to the second request.

A second example embodiment may involve receiving a first request to write, to persistent storage, first type-specific information of a first type for a first entity, wherein the persistent storage contains a parent table and one or more child tables, wherein the parent table contains: (i) a class field specifying types, and (ii) one or more type-specific filter fields, wherein the types are respectively associated with different tables from the one or more child tables, and wherein the one or more type-specific filter fields are respectively associated with one or more of the types. The second example embodiment may also involve determining that, in a first entry of the parent table, the first type is specified in the class field. The second example embodiment may also involve writing, to a particular child table of the one or more child tables, the first type-specific information, wherein the particular child table is associated with the first type. The second example embodiment may also involve receiving a second request to write, to the persistent storage, second type-specific information of a second type for a second entity. The second example embodiment may also involve determining that, in a second entry of the parent table for the second entity, the second type is indicated as present by a particular type-specific filter field that is associated with the second type. The second example embodiment may also involve writing the second type-specific information to a set of additional fields in the second entry of the parent table, wherein the set of additional fields is associated with the particular type-specific filter field.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts another database schema, in accordance with example embodiments.

DETAILED DESCRIPTION

Figure 1:
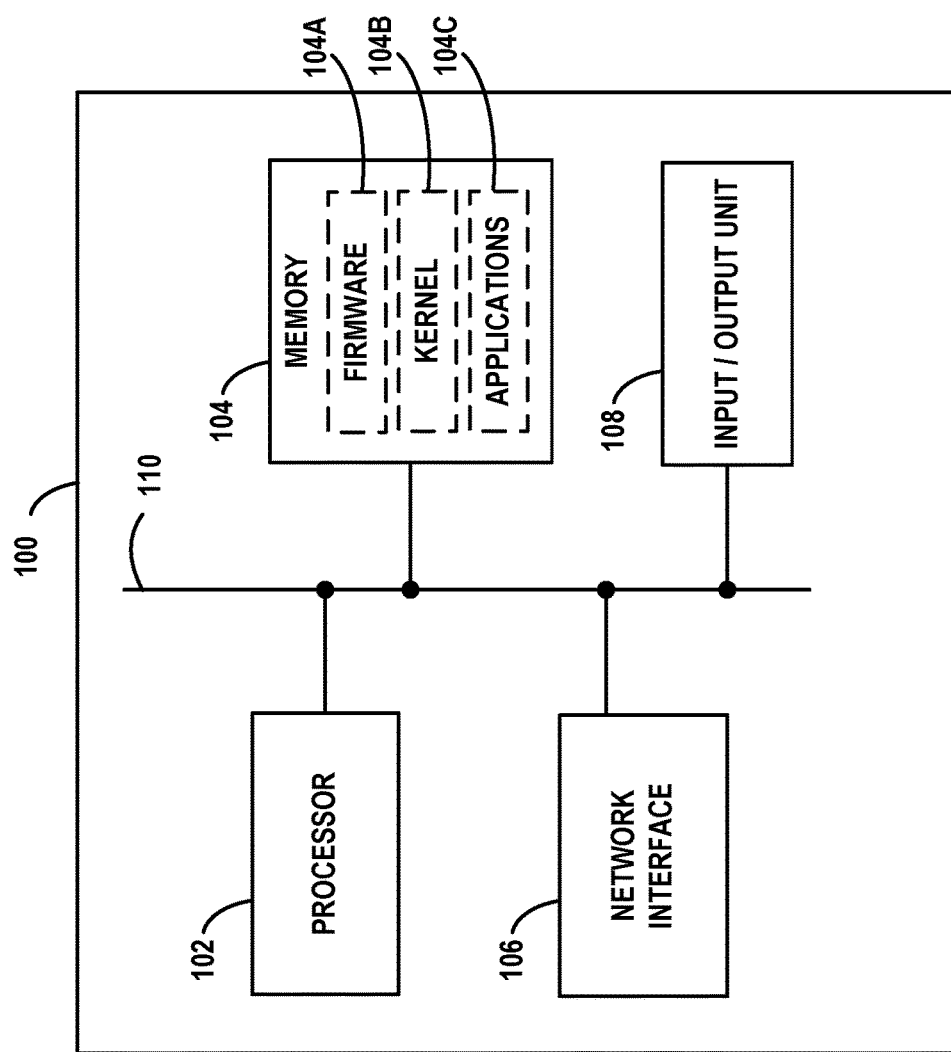
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
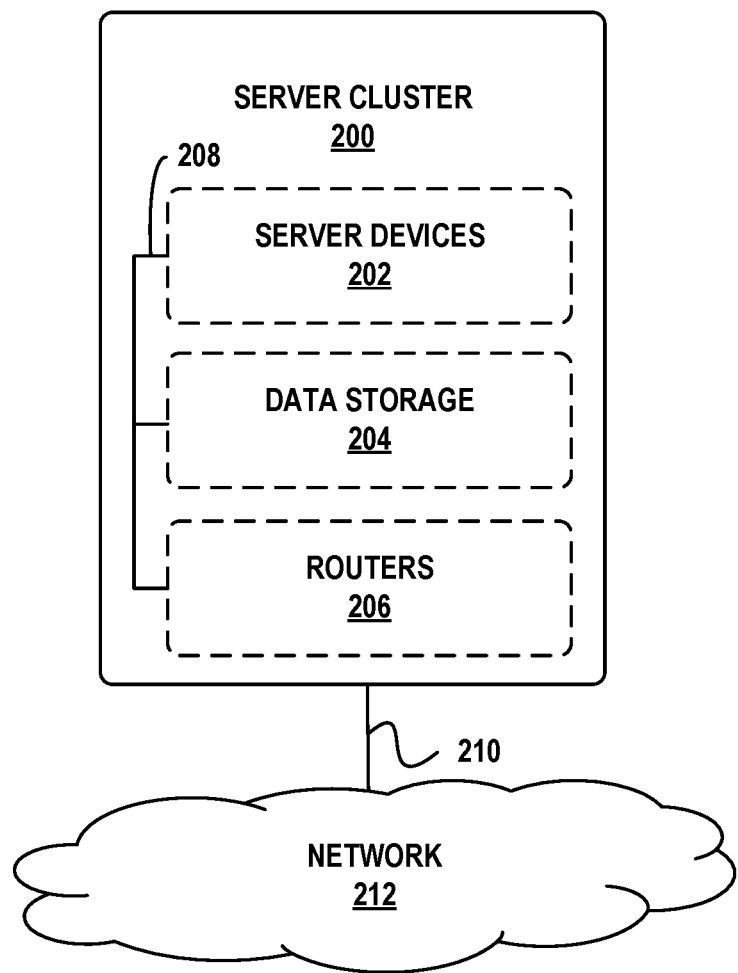
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
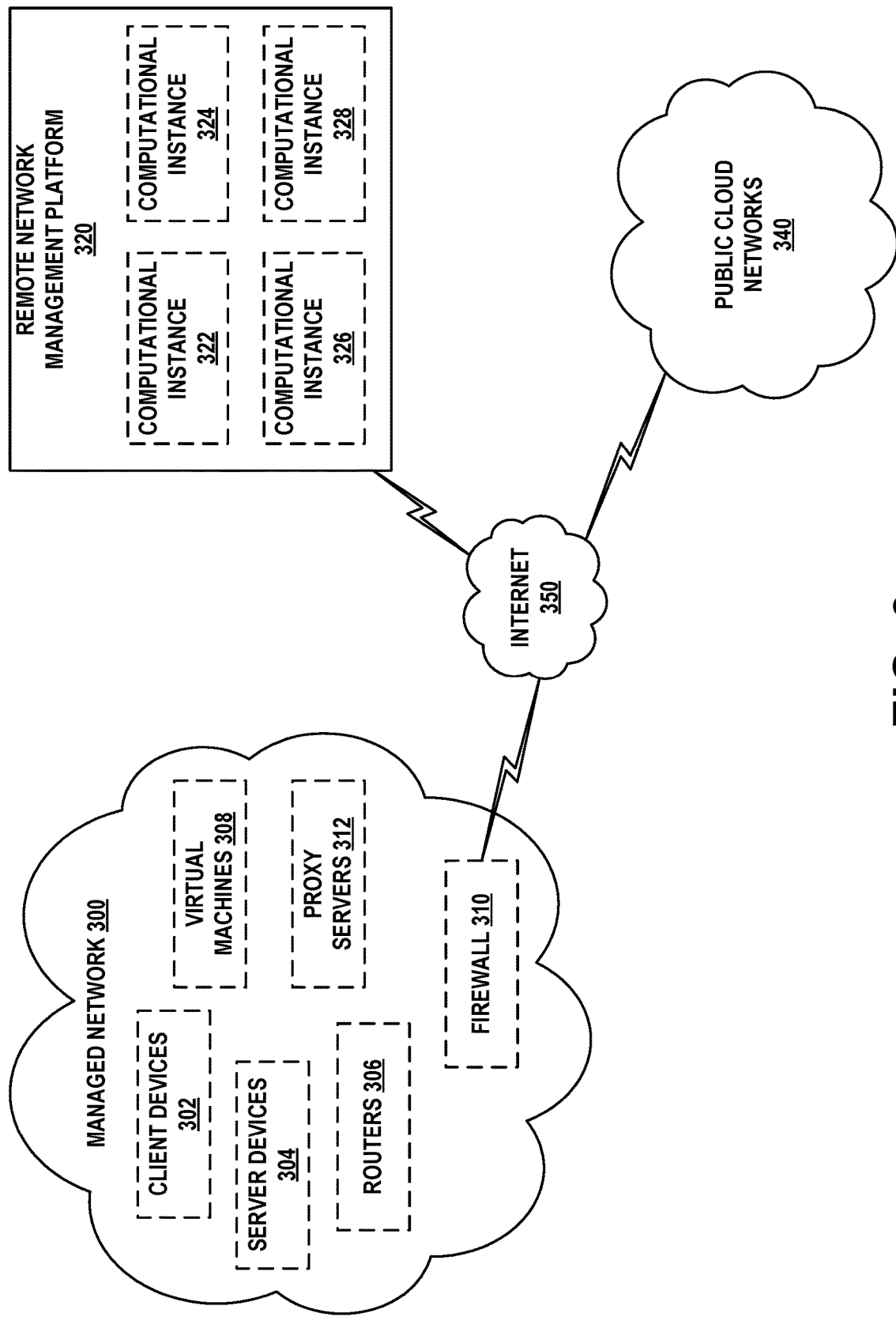
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
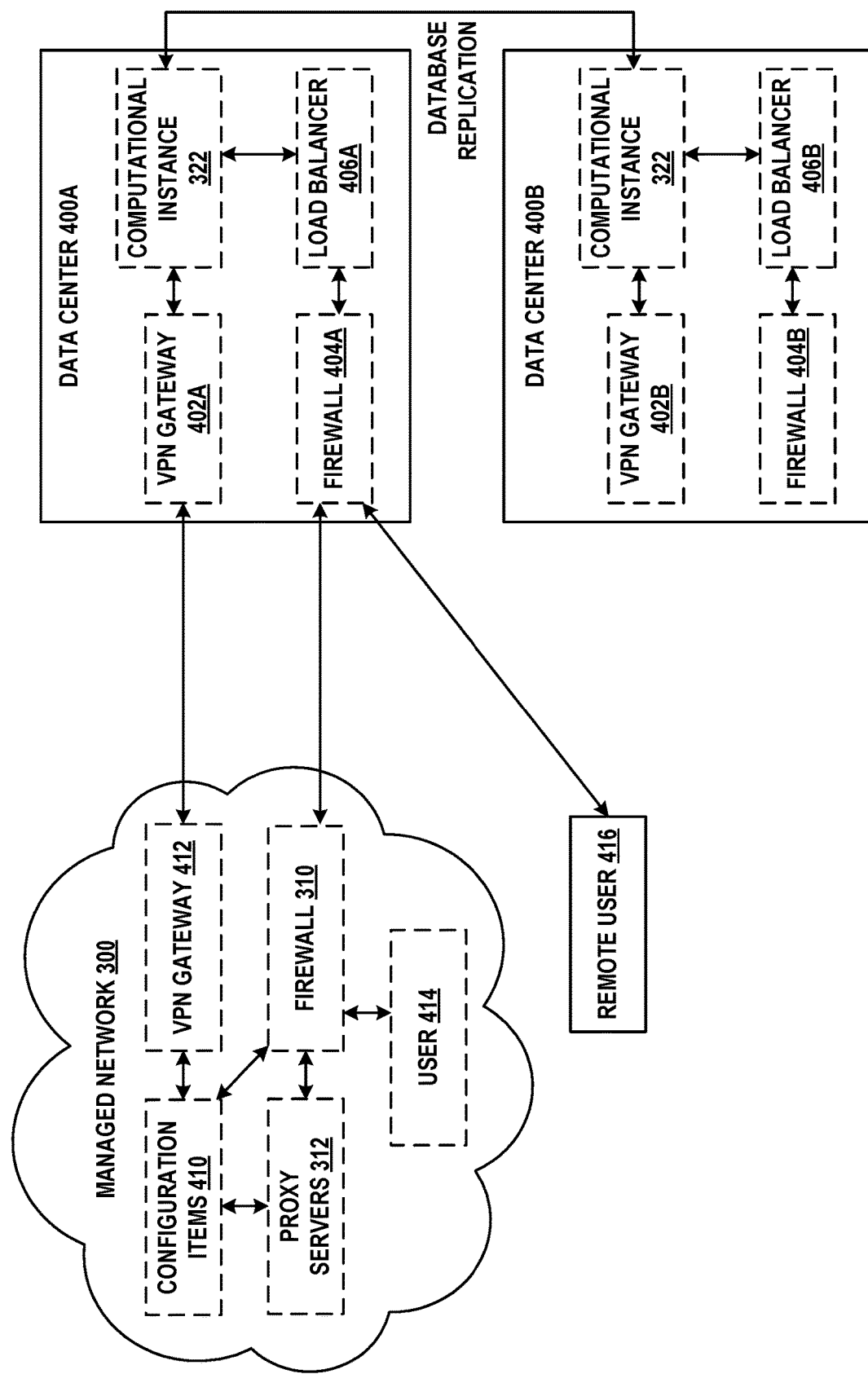
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
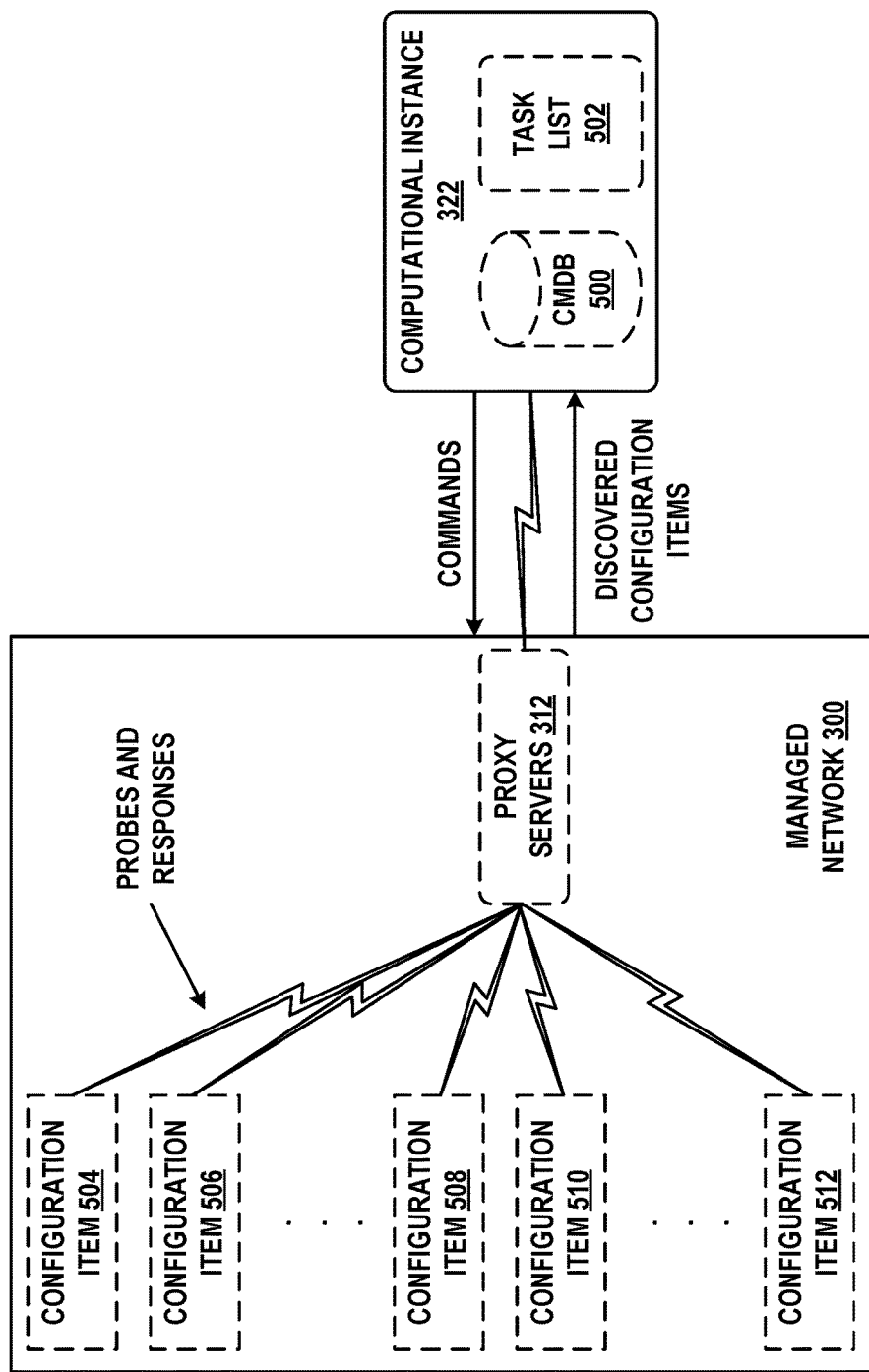
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
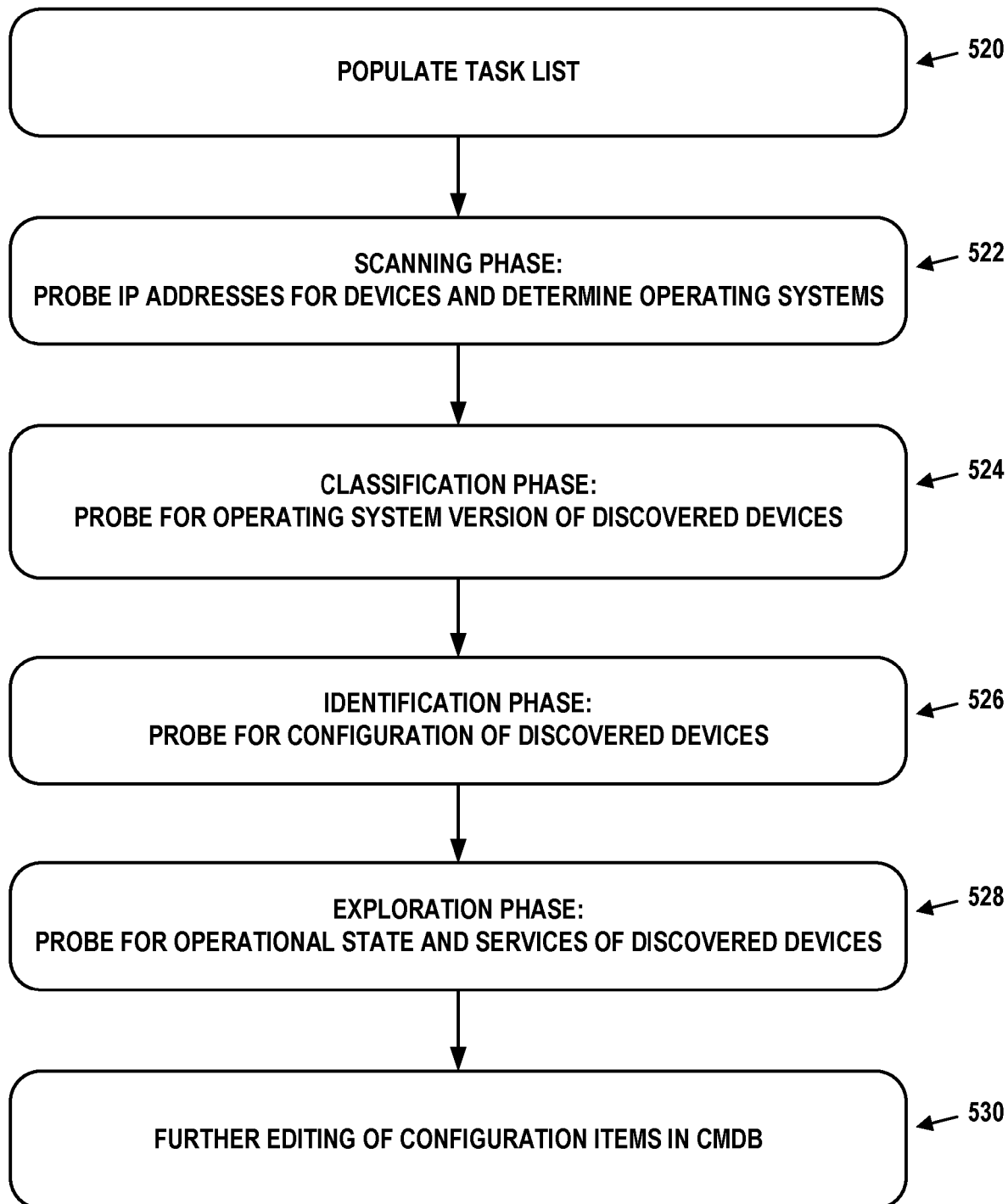
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Database Schemas for Multi-Typed Users

As noted, a computational instance may facilitate the use of numerous software applications by a large number of users. Each user may have a unique identifier (e.g., a userid) with which that user can log on to the computational instance in order to access these software applications. User records may be stored as entries in one or more database tables that specify information about the users and their capabilities. Each user may be assigned a particular type or class, such as customer (for customers of the entity controlling the computational instance), vendor (for venders of the entity controlling the computational instance), or citizen (for nationals or residents of a country or legal jurisdiction that is controlling the computational instance).

The computational instance (and possibly the entire remote network management platform as well) may be designed to operate in a table-per-class (TPC) model (sometimes referred to as an extension model) that allows data to be defined in an object-oriented, hierarchical fashion. When applied to users, the associated implementation may take the form of a parent table containing information on all users as well as a specification of each user's type. Further, each type of user may have its own table (a child table) defining information specific to users of that class. Thus, the types (classes) of users may possibly have a one-to-one mapping to child tables, though such relationships are not required. These child tables may have additional child tables of their own, specifying further sub-types of users.

Herein, the terms "type" and "class" may be used interchangeably unless context suggests otherwise. The "class" terminology reflects the object-oriented hierarchy that can be employed, while the "type" terminology often preferred because it is more descriptive.

Figure 6:
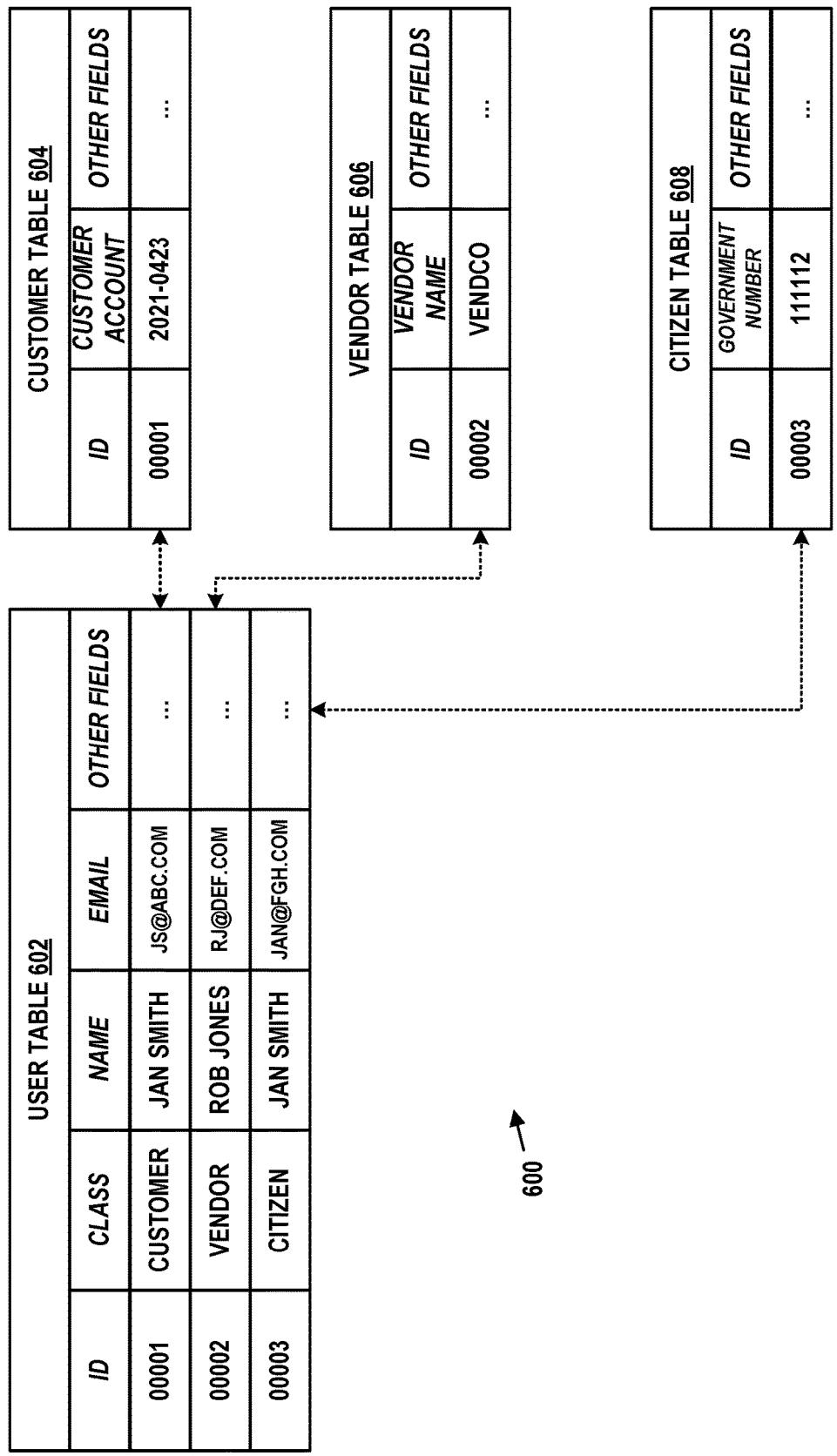
FIG. 6 depicts a database schema, in accordance with example embodiments.

FIG. 6 depicts a possible implementation of the TPC model for users. Database schema 600 defines four tables, user table 602 (the parent), as well as customer table 604, vendor table 606, and citizen table 608 (the children). Notably, this is just one possible arrangement of users into classes. Other kinds of classes (e.g., employees and contractors) may be possible.

User table 602 defines columns for ID (a unique identifier, e.g., a userid, for each entry in user table 602), class (the type of the entry), name (the name of the individual associated with the entry), email (the email address of the individual associated with the entry), and other fields. These other fields may include any kind of information relevant to the users, such as mailing addresses, hashed passwords, single sign-on (SSO) data, default user interface display options, and so on.

Each type (class) of user represented in user table 602 has its own child table, and each of the child tables stores further information about users of that type. Relationships between entries in user table 602 and entries in customer table 604, vendor table 606, and citizen table 608 are shown in FIG. 6 as dotted lines with arrows.

For instance, the first entry in user table 602 has an ID of 00001 and is of the customer class. Accordingly, there is an entry for this user in customer table 604. That entry has the same ID of 00001, and the fields of customer table 604 define further customer-specific information for the user, such as a customer account number. Likewise, the second entry in user table 602 has an ID of 00002 and is of the vendor class. Accordingly, there is an entry for this user in vendor table 606. That entry has the same ID of 00002, and the fields of vendor table 606 define further vendor-specific information for the user, such as a vendor name.

This hierarchical arrangement works reasonably well in many systems. A limitation, however, is that it supports only one type of parent class per user. Yet, there are numerous types of systems in which some users may exist in multiple classes. For example, a customer of an entity may also be a vendor to that entity. Similarly, a citizen of a governmental body may also be a vendor to that body. The traditional TPC model is not extendable to reflect such arrangements.

As a workaround, users with multiple types may be given multiple userids on the system, one for each type. This is reflected in FIG. 6 where user Jan Smith has two entries in user table 602, one as a customer (ID 00001) and another as a citizen (ID 00003). Accordingly, there is an entry for Jan Smith (as ID 00003) in citizen table 608. The fields of citizen table 608 define further citizen-specific information for Jan Smith, such as a government number (e.g., a social security number, driver's license number, or some other type of number). The two entries for Jan Smith in user table 602 each specify a different email address, and other fields across these two entries may also differ.

While this arrangement allows multi-typed users to be able to access all of the information associated with each of their types, doing so can be cumbersome. The user has to keep track of which role they are in (as defined by type) at any time they are logged on to the computational instance. If the user needs to access information associated with a different one of their roles, they will need to log out and back in to the computational instance, using the set of credentials associated with that other role (e.g., Jan Smith might have to log out of her customer account and then log back in to access data from her citizen account).

This requires that multi-typed users remember or otherwise keep track of multiple login credentials, one for each type. This can be burdensome, especially since some users might have three or more types. Further, each entry in user table 602 for the same user takes up additional storage space in the database, and may contain some duplicative information about the user. Therefore, from a storage point of view, this technique for supporting multi-typed users is inefficient.

In some environments, an improved model may be possible that collapses some or all of the user types into the parent table (e.g., user table 602). Doing so could potentially eliminate the child tables, and thus the hierarchy of tables. For example, all fields from all child tables could be placed into user table 602, and filter fields may be used to specify the types to which the user belongs. When a filter field for a type indicates that the user is of that type, the fields that are specific to that type are assumed to be valid. When a filter field for a type indicates that the user is not of that type, the fields that are specific to that type are assumed to be invalid. Thus, there can possibly be one-to-one relationships between type-specific filter fields and types, but such one-to-one relationships need not exist. In some implementations, more than one field may be used as filter fields for a particular type (e.g., the information to determine whether a user is of a particular type may be split across multiple fields).

FIG. 7 depicts database schema 700, which uses such a single-table structure. In user table 702, each entry is associated with a single user who may have multiple types. There are three Boolean filter fields, for the customer, vendor, and citizen types. When a user is a member of one of the associated types, the filter field for that type is set to "yes". Otherwise, the filter field is set to "no".

Continuing with the previous example, user Jan Smith is of the customer and citizen types, and therefore the customer and citizen filter fields for her entry in user table 702 are set to "yes". Jan Smith is not of the vendor type, so the vendor filter field for her entry is set to "no". Conversely, user Rob Jones is not of the customer and citizen types, so the customer and citizen filter fields for his entry in user table 702 are set to "no". Rob Jones is of the vendor type, so the vendor filter field for his entry is set to "yes".

When a filter field is set to "yes" then one or more additional fields may be valid. In user table 702, the customer filter field being set to "yes" indicates that the customer account field is valid, the vendor filter field being set to "yes" indicates that the vendor name field is valid, and the citizen filter field being set to "yes" indicates that the government number field is valid. If any of these additional fields are not valid, they are indicated as such with the denotation "N/A" and may be represented by an empty string or a null value in the database.

Thus, a software application that seeks to determine the customer account of Jan Smith would first verify that the customer filter field is "yes" and then read the value out of the customer account field. Likewise, a software application that seeks to determine the government number of Jan Smith would first verify that the citizen filter field is "yes" and then read the value out of the government number field.

In general, there may be further fields in user table 702, including one or more additional fields that are only valid when certain filter fields are set to "yes". User table 702 is intended to be a simplified illustration of a single-table implementation, for purposes of example.

While the database structure and associated operations described in the context of FIG. 7 is an effective way of supporting multi-typed users, its usefulness is limited by the fact that there is often a large installed base of user entries in a computational instance. For example, deployed remote network management platforms may support numerous computational instances, each supporting hundreds, thousands, or tens of thousands of users.

Further, both out-of-the-box and customized software applications installed on platforms with user information arranged according to schema 600, may have been written to operate with the multiple table approach of that schema. Thus, attempting to deploy a computational instance with schema 700 or upgrade a computational instance from schema 600 to schema 700 may result in numerous software applications failing to locate user entries in the database. As a consequence, users may not be able to log on to the platform, rendering it effectively unusable. Thus, a more sophisticated approach is required.

Figure 8:
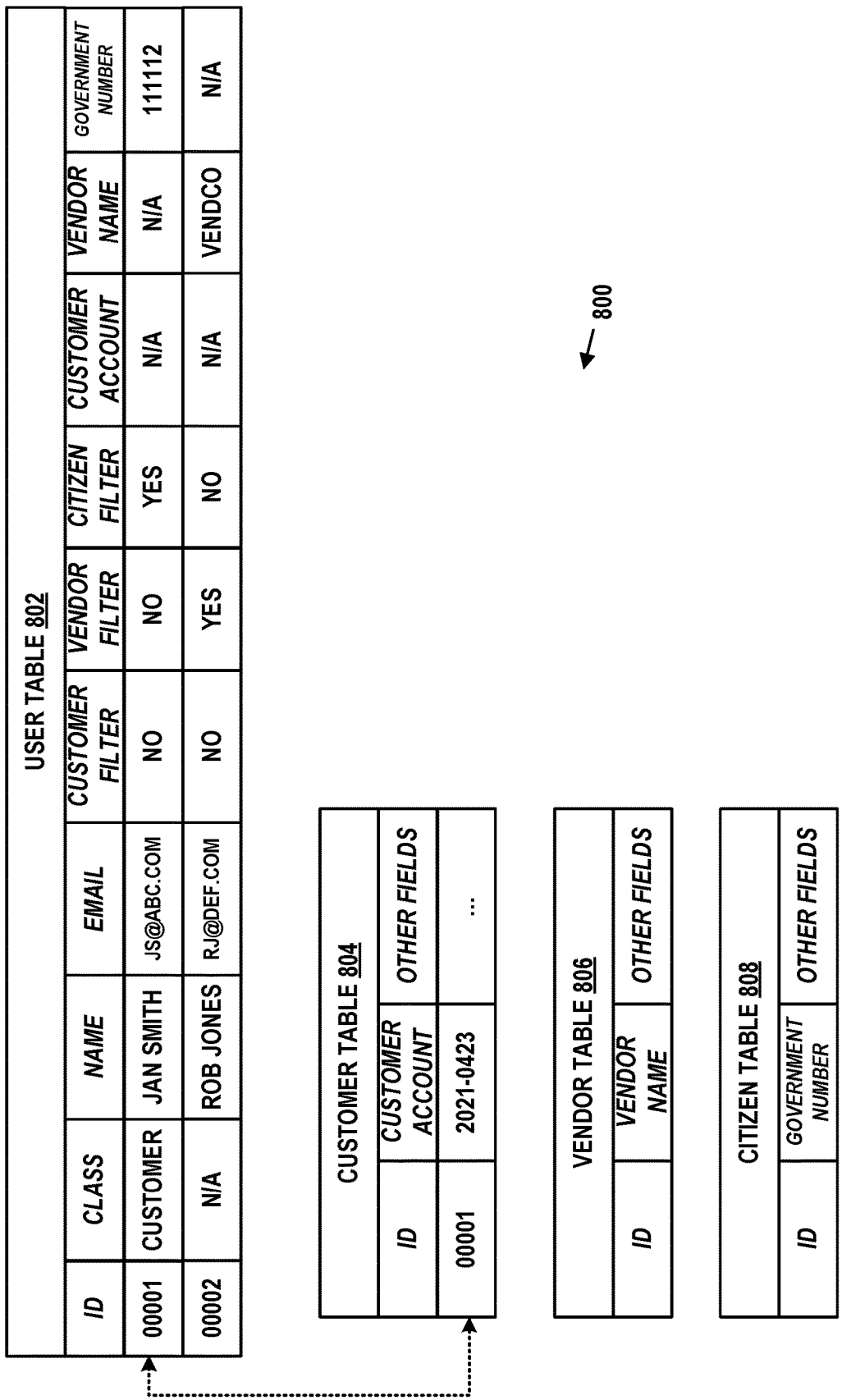
FIG. 8 depicts yet another database schema, in accordance with example embodiments.

To that end, FIG. 8 depicts database schema 800, which uses a combined single-table and multi-table structure to support multi-typed users with backwards compatibility to the TPC model of schema 600. Notably, schema 800 includes user table 802, which has all of the fields from user tables 602 and 702. Therefore, user table 802 includes the class field, customer filter field, vendor filter field, and citizen field, as well as any additional fields that are also specified in customer table 804, vendor table 806, and citizen table 808. Regarding those three child tables, customer table 804 includes customer-specific fields, vendor table 806 includes vendor-specific fields, and citizen table 808 includes citizen-specific fields. Thus, these tables can be identical to their counterparts in FIG. 6. Further, in some but not all embodiments, there may be one-to-one relationships between type-specific filter fields and child tables for that type.

Type-specific information relating to a user may appear either in user table 802 or the child table associated with that type. Preferably, this distinction is based on whether the class field of user table 802 is populated. If this is the case, then type-specific information relating to that class is in the associated child table. If not, but the type-specific filter for that type is set to "yes", then type-specific information relating to that class may appear in the additional fields for that type in user table 802. In the case that the class field of user table 802 is not populated and the type-specific filter for that type is set to "no", then there is no type-specific information for that type (and therefore the user is not of that type).

As an example, the entry for Jan Smith in user table 802 has a class field populated with the type customer. This indicates that there is an entry for Jan Smith in customer table 804. This entry provides additional customer-specific information relating to Jan Smith (i.e., her customer account). Accordingly, the customer filter for Jan Smith is set to "no" and the customer account field in user table 802 is not valid.

Jan Smith's vendor filter field is also set to "no", thus indicating that the vendor name field for her in user table 802 is also invalid. Note that it is assumed that there is no entry for Jan Smith in vendor table 806 because her class field in user table 802 takes on a value of customer.

Jan Smith's citizen filter field is set to "yes", therefore indicating that the government number field for her in user table 802 is valid. Accordingly, that field is populated in user table 802. Again, it is assumed that there is no entry for Jan Smith in citizen table 808 because her class field in user table 802 takes on a value of customer.

Thus, Jan Smith's information is split between user table 802 and customer table 804. This arrangement supports environments where a legacy database schema (e.g., schema 600) has been used to specify her customer-specific information, and therefore that data should remain in place for purposes of backwards compatibility with legacy software applications. However, her citizen-specific information is maintained in user table 802. This allows Jan Smith to be effectively multi-typed for newer applications.

In contrast, Rob Jones is only of one type, vendor, and all of his vendor-specific information is stored in user table 802. His class field in that table is set to a null or a default value, which indicates that there are no entries for him in the child tables and that his type(s) can be determined by examining the values of his customer filter field, vendor filter field, and citizen filter field. Of these, only his vendor filter field is set to "yes". Therefore, the values for his customer-specific and citizen-specific fields are valid while the values for his vendor-specific fields are valid. More types can be added for any user by using the appropriate additional fields of user table 802.

While schema 800 depicts using either user table 802 or a child table to store all information specific to a given type of user, other arrangements that split the information between tables are possible. Further, multi-type users may have all of their type-specific information stored in user table 802. Other arrangements are possible.

Figure 9A:
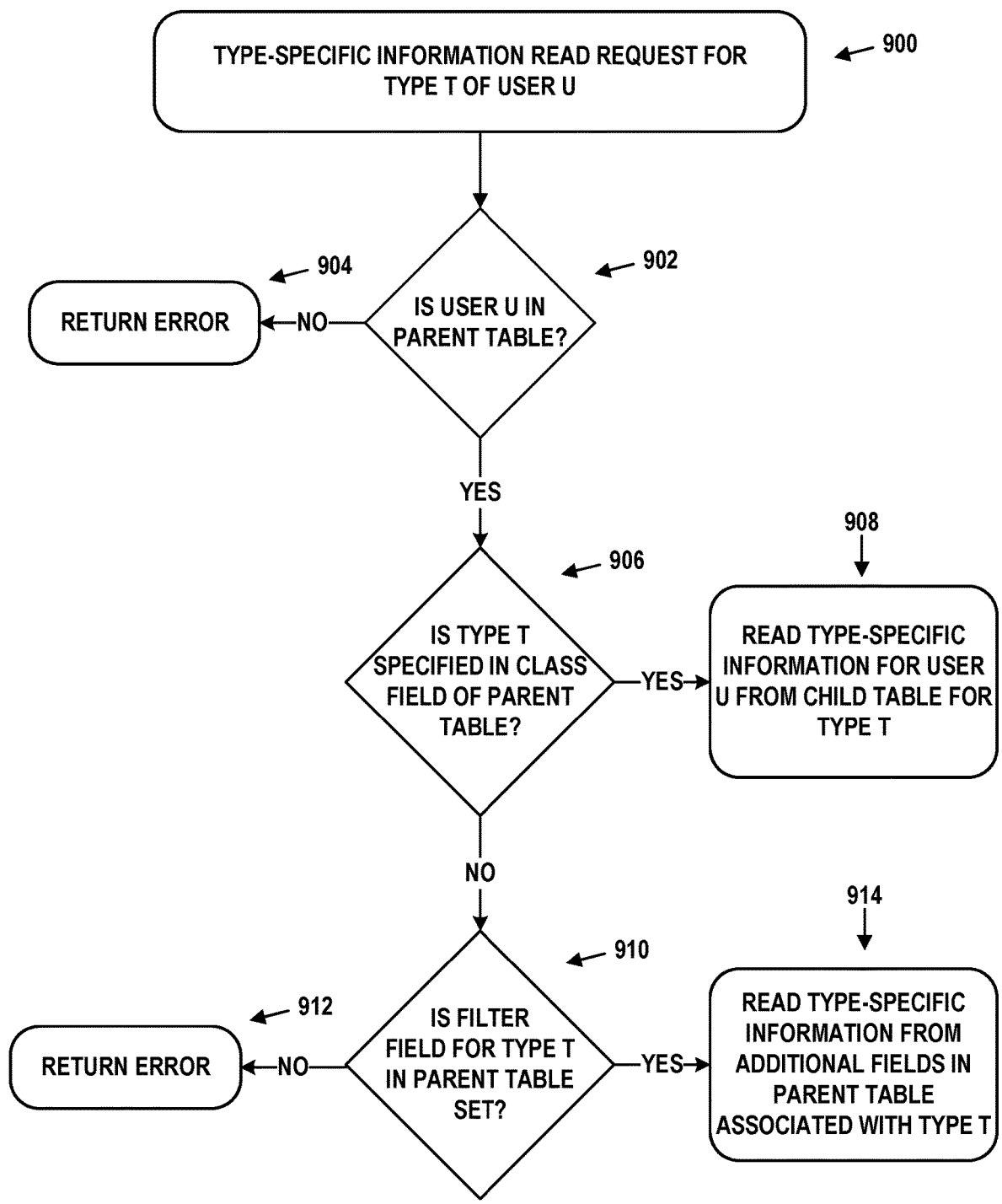
FIG. 9A depicts a process for reading from a database, in accordance with example embodiments.
Figure 9B:
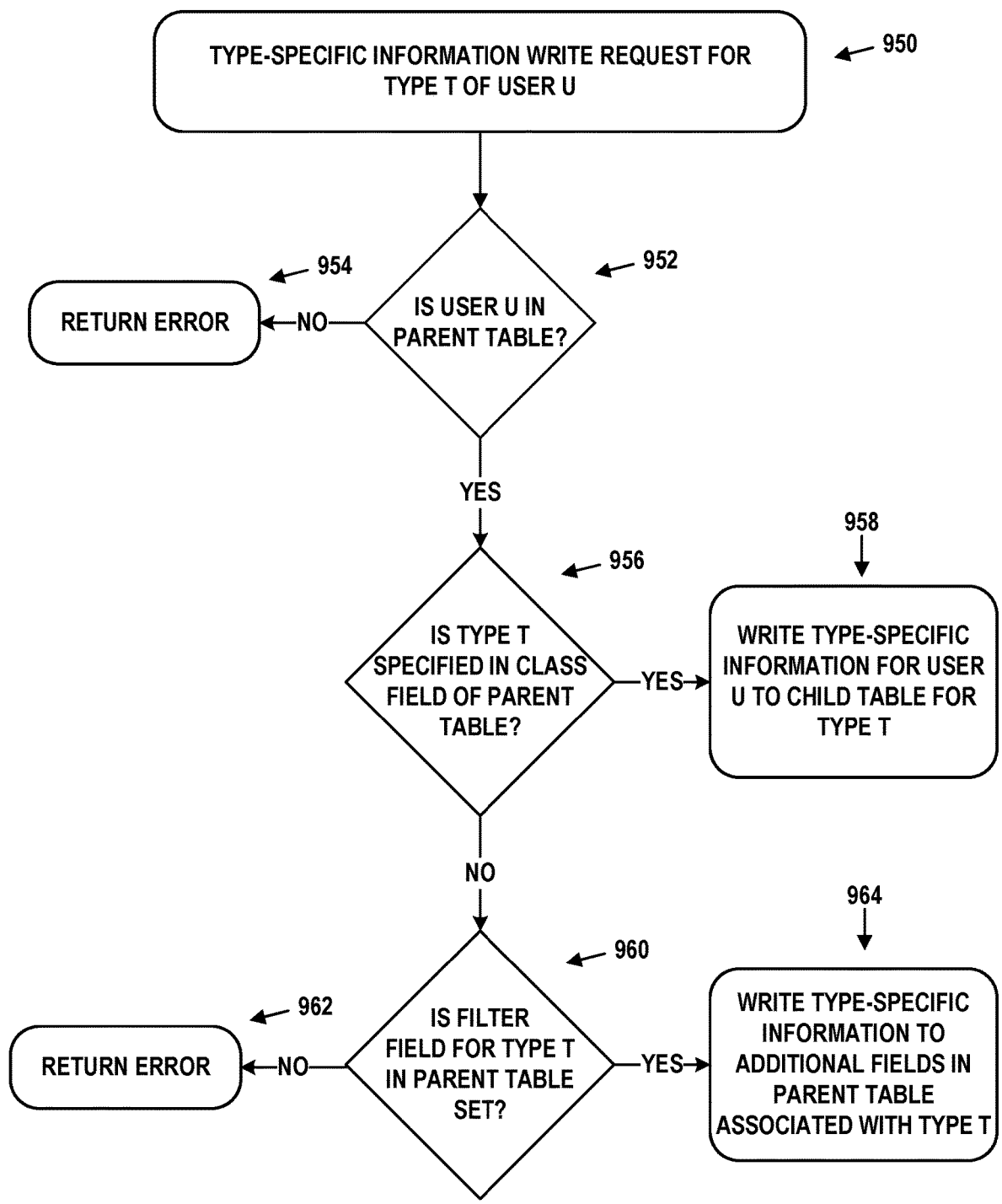
FIG. 9B depicts a process for writing to a database, in accordance with example embodiments.

Given that schema 800 is backwards compatible with legacy software applications, these legacy applications need not be modified to continue to work with schema 800, so long as all of the type-specific information for a particular type of interest to an application is in a child table. Non-legacy software applications, however, need to be able to check both the parent and a type-specific child table for this information. FIGS. 9A and 9B illustrate how to do so for reading and writing, respectively.

FIG. 9A is a flow chart depicting processing performed by a computational instance in response to a read request. Particularly, at step 900, a type-specific read request arrives at the computational instance. This read request seeks to obtain the type-specific information of type T for user U.

At step 902, the computational instance determines whether user U is in the parent table (e.g., user table 802). If not, then the user U is not in the system and, at step 904, the computational instance returns an error.

If user U is in the parent table, then, at step 906, the computational instance determines whether type T is specified in the class field of the parent table. If this is the case, then, at step 908, the computational instance reads the type-specific information for user U from the child table associated with type T.

If type T is not specified in the class field of the parent table, then, at step 910, the computational instance determines whether a filter field for type T in the parent table is set (e.g., has a value of "yes"). If not, then the user U is not of type T and, at step 912, the computational instance returns an error. Otherwise, at step 914, the computational instance reads the type-specific information from the additional fields in the parent type that are associated with type T.

FIG. 9B is a flow chart depicting processing performed by a computational instance in response to a write request. Particularly, at step 950, a type-specific write request arrives at the computational instance. This write request seeks to store type-specific information of type T for user U.

At step 952, the computational instance determines whether user U is in the parent table (e.g., user table 802). If not, then the user U is not in the system and, at step 954, the computational instance returns an error.

If user U is in the parent table, then, at step 956, the computational instance determines whether type T is specified in the class field of the parent table. If this is the case, then, at step 958, the computational instance writes the type-specific information for user U to the child table associated with type T.

If type T is not specified in the class field of the parent table, then, at step 960, the computational instance determines whether a filter field for type T in the parent table is set. If not, then the user U is not of type T and, at step 962, the computational instance returns an error. Otherwise, at step 964, the computational instance writes the type-specific information to the additional fields in the parent type that are associated with type T.

Notably, the procedures of FIGS. 9A and 9B can vary to some extent, in terms of the order in which some of the conditions are checked as well as where information is located in the schema. Thus, these procedures are provided for purposes of example. Further, these procedures and other disclosure herein may be used to support other forms of multi-typed data aside from just users. For example, any data items modeled using a hierarchical, object-oriented, and/or TPC framework can be made to support multiple types with backwards compatibility by employing implementations that are analogous to those herein.

VI. Example Operations

Figure 10A:
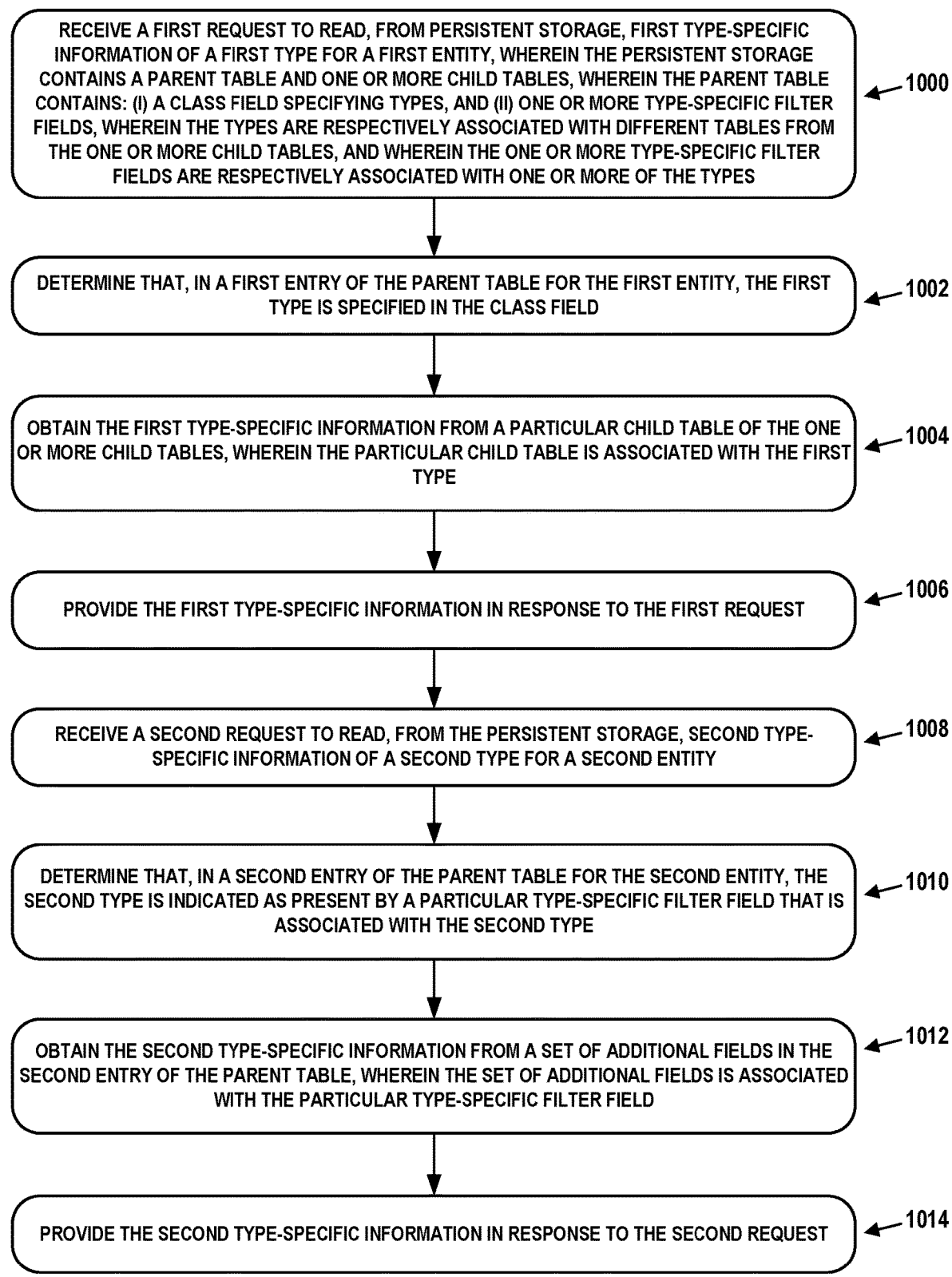
FIG. 10A is a flow chart, in accordance with example embodiments.

FIG. 10A is a flow chart illustrating an example embodiment. The process illustrated by FIG. 10A may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10A may be simplified by the removal of any one or more of the features shown therein. Further, these embodiments may be combined with features, aspects, and/or implementations of any of the previous figures or otherwise described herein.

Block 1000 may involve receiving a first request to read, from persistent storage, first type-specific information of a first type for a first entity, wherein the persistent storage contains a parent table and one or more child tables, wherein the parent table contains: (i) a class field specifying types, and (ii) one or more type-specific filter fields, wherein the types are respectively associated with different tables from the one or more child tables, and wherein the one or more type-specific filter fields are respectively associated with one or more of the types.

Block 1002 may involve determining that, in a first entry of the parent table for the first entity, the first type is specified in the class field.

Block 1004 may involve obtaining the first type-specific information from a particular child table of the one or more child tables, wherein the particular child table is associated with the first type.

Block 1006 may involve providing the first type-specific information in response to the first request.

Block 1008 may involve receiving a second request to read, from the persistent storage, second type-specific information of a second type for a second entity.

Block 1010 may involve determining that, in a second entry of the parent table for the second entity, the second type is indicated as present by a particular type-specific filter field that is associated with the second type.

Block 1012 may involve obtaining the second type-specific information from a set of additional fields in the second entry of the parent table, wherein the set of additional fields is associated with the particular type-specific filter field.

Block 1014 may involve providing the second type-specific information in response to the second request.

Some embodiments may further involve receiving a third request to read, from the persistent storage, third type-specific information of the second type for the first entity; determining that, in the first entry of the parent table, the second type is indicated as present by the particular type-specific filter field; obtaining the third type-specific information from the set of additional fields in the first entry of the parent table; and providing the third type-specific information in response to the third request.

Some embodiments may further involve searching the parent table for the first entity; and determining that the first entry is associated with the first entity.

In some embodiments, the one or more type-specific filter fields are respectively associated with one or more additional fields in the parent table.

In some embodiments, the first entity is a first user and the second entity is a second user, wherein the first type-specific information and the second type-specific information each relate to one or more of logging on, permissions to access specific units of data in the persistent storage, or presentation of material on a graphical user interface.

In some embodiments, obtaining the first type-specific information comprises reading, from fields of an entry in the particular child table associated with the first entity, the first type-specific information.

In some embodiments, the first entity is associated with a unique identifier, wherein the first entry of the parent table contains the unique identifier, wherein the entry in the particular child table contains the unique identifier, and wherein reading the first type-specific information comprises: searching entries of the particular child table for the unique identifier; and locating the unique identifier in the entry in the particular child table.

Some embodiments may further involve determining that, in the second entry of the parent table, the second type is not specified in the class field, wherein the particular type-specific filter field is considered based on the second type being not specified in the class field.

Some embodiments may further involve receiving a third request to write, to the persistent storage, third type-specific information of the first type for the first entity; determining that, in the first entry of the parent table, the first type is specified in the class field; writing, to the particular child table, the third type-specific information; receiving a fourth request to write, to the persistent storage, fourth type-specific information of the second type for the second entity; determining that, in the second entry of the parent table, the second type is indicated as present by the particular type-specific filter field that is associated with the second type; and writing, to the set of additional fields in the parent table, the fourth type-specific information.

In some embodiments, obtaining the first type-specific information occurs in response to determining that, in the first entry of the parent table for the first entity, the first type is specified in the class field, wherein obtaining the second type-specific information occurs in response to determining that, in the second entry of the parent table for the second entity, the second type is indicated as present by the particular type-specific filter field that is associated with the second type.

Figure 10B:
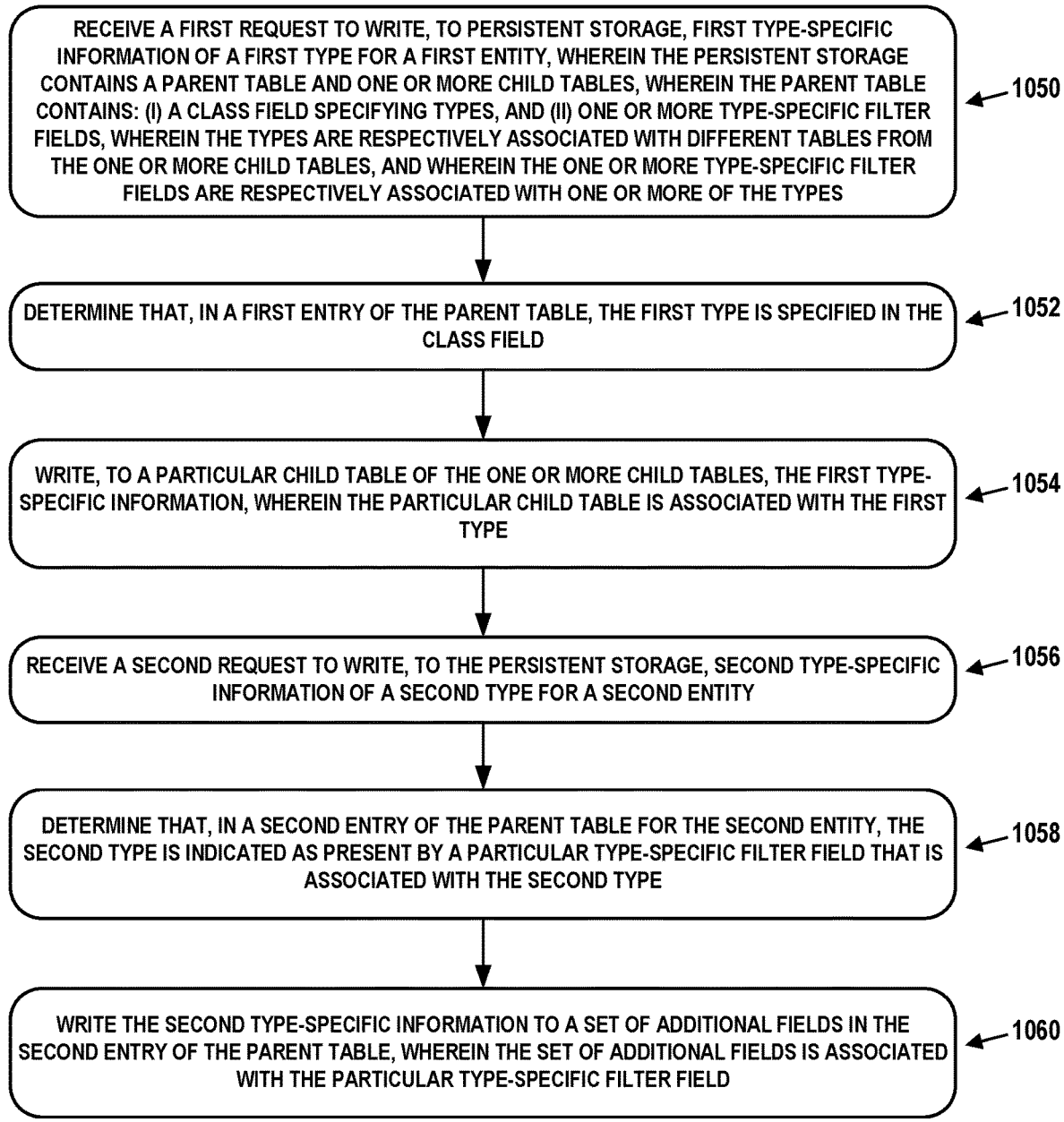
FIG. 10B is a flow chart, in accordance with example embodiments.

FIG. 10B is a flow chart illustrating an example embodiment. The process illustrated by FIG. 10B may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10B may be simplified by the removal of any one or more of the features shown therein. Further, these embodiments may be combined with features, aspects, and/or implementations of any of the previous figures or otherwise described herein.

Block 1050 may involve receiving a first request to write, to persistent storage, first type-specific information of a first type for a first entity, wherein the persistent storage contains a parent table and one or more child tables, wherein the parent table contains: (i) a class field specifying types, and (ii) one or more type-specific filter fields, wherein the types are respectively associated with different tables from the one or more child tables, and wherein the one or more type-specific filter fields are respectively associated with one or more of the types.

Block 1052 may involve determining that, in a first entry of the parent table, the first type is specified in the class field.

Block 1054 may involve writing, to a particular child table of the one or more child tables, the first type-specific information, wherein the particular child table is associated with the first type.

Block 1056 may involve receiving a second request to write, to the persistent storage, second type-specific information of a second type for a second entity.

Block 1058 may involve determining that, in a second entry of the parent table for the second entity, the second type is indicated as present by a particular type-specific filter field that is associated with the second type.

Block 1060 may involve writing the second type-specific information to a set of additional fields in the second entry of the parent table, wherein the set of additional fields is associated with the particular type-specific filter field.

Some embodiments may involve: receiving a third request to write, to the persistent storage, third type-specific information of the second type for the first entity; determining that, in the first entry of the parent table, the second type is indicated as present by the particular type-specific filter field; and writing the third type-specific information to the set of additional fields in the first entry of the parent table.

Some embodiments may involve searching the parent table for the first entity; and determining that the first entry is associated with the first entity.

In some embodiments, writing the first type-specific information comprises writing, to fields of an entry in the particular child table associated with the first entity, the first type-specific information.

In some embodiments, the first entity is associated with a unique identifier, wherein the first entry of the parent table contains the unique identifier, wherein the entry in the particular child table contains the unique identifier, and wherein writing the first type-specific information comprises: searching entries of the particular child table for the unique identifier; and locating the unique identifier in the entry in the particular child table.

In some embodiments, the one or more type-specific filter fields are respectively associated with one or more additional fields in the parent table.

In some embodiments, the first entity is a first user and the second entity is a second user, wherein the first type-specific information and the second type-specific information each relate to one or more of logging on, permissions to access specific units of data in the persistent storage, or presentation of material on a graphical user interface.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
receiving, by a server device, from a software application, a request to read type-specific information of a particular type for an entity;
determining, by the server device, that, in an entry for the entity in a parent database table of a database, the particular type is not specified in a class field and that the particular type is indicated as present by a type-specific filter field that is associated with the particular type;
in response to determining that the particular type is indicated as present, obtaining, by the server device, the type-specific information from a set of additional fields in the entry, wherein the set of additional fields is associated with the type-specific filter field; and
providing, by the server device, to the software application, the type-specific information in response to the request.

2. The method of claim 1, further comprising:
receiving a second request to read second type-specific information of a second particular type for a second entity;
determining that, in an second entry for the second entity in the parent database table, the second particular type is specified in the class field of the second entry;
in response to determining that the second particular type is specified in the class field, obtaining the second type-specific information from a child database table of one or more child database tables of the parent database table, wherein the child database table is associated with the second particular type; and
providing the second type-specific information in response to the second request.

3. The method of claim 2, wherein the entity is a first user and the second entity is a second user, and wherein the type-specific information and the second type-specific information each relate to one or more of logging on to a system, permissions to access specific units of data in memory, or presentation of material on a graphical user interface.

4. The method of claim 2, wherein obtaining the second type-specific information comprises reading, from fields of a further entry for the second entity in the child database table, the second type-specific information.

5. The method of claim 4, wherein the second entity is associated with a unique identifier, wherein the second entry in the parent database table contains the unique identifier, wherein the further entry in the child database table contains the unique identifier, and wherein reading the second type-specific information comprises:
searching entries of the child database table for the unique identifier; and
locating the unique identifier in the entry in the child database table.

6. The method of claim 2, further comprising:
receiving a further request to write further type-specific information of the second particular type for the second entity;
determining that, in the second entry in the parent database table, the second particular type is specified in the class field; and
writing, to the child database table, the further type-specific information.

7. The method of claim 1, further comprising:
receiving a further request to write further type-specific information of the particular type for the entity;
determining that, in the entry in the parent database table, the particular type is indicated as present by the type-specific filter field that is associated with the particular type; and
writing, to the parent database table, the further type-specific information.

8. A method comprising:
receiving, by a server device, from a software application, a request to write type-specific information of a particular type for an entity;
determining, by the server device, that, in an entry for the entity in a parent database table of a database, the particular type is not specified in a class field and that the particular type is indicated as present by a type-specific filter field that is associated with the particular type; and
in response to determining that the particular type is indicated as present, writing, by the server device, the type-specific information to a set of additional fields in the entry of the parent database table, wherein the set of additional fields is associated with the type-specific filter field.

9. The method of claim 8, further comprising:
receiving a second request to write second type-specific information of a second particular type for a second entity;
determining that, in a second entry for the second entity in the parent database table, the second particular type is specified in the class field of the second entry; and
in response to determining that the second particular type is specified in the class field, writing to a child database table of one or more child database tables of the parent database table the second type-specific information, wherein the child database table is associated with the second particular type.

10. The method of claim 8, further comprising:
searching the parent database table for the entity; and
determining that the entry is associated with the entity.

11. The method of claim 9, wherein writing the second type-specific information comprises writing, to fields of a further entry for the entity in the child database table, the second type-specific information.

12. The method of claim 11, wherein the second entity is associated with a unique identifier, wherein the second entry contains the unique identifier, wherein the further entry contains the unique identifier, and wherein writing the second type-specific information comprises:
searching entries of the child database table for the unique identifier; and
locating the unique identifier in the entry.

13. A non-transitory computer-readable storage medium containing instructions that, when executed by one or more processors, cause one or more computing devices to perform operations comprising:
- receiving, from a software application, a request to read type-specific information of a particular type for an entity;
- determining that, in an entry for the entity in a parent database table of a database, the particular type is not specified in a class field and that the particular type is indicated as present by a type-specific filter field that is associated with the particular type;
- in response to determining that the particular type is indicated as present, obtaining the type-specific information from a set of additional fields in the entry, wherein the set of additional fields is associated with the type-specific filter field; and
- providing, to the software application, the type-specific information in response to the request.

14. The non-transitory computer-readable storage medium of claim 13, the operations further comprising:
- receiving a second request to read second type-specific information of a second particular type for a second entity;
- determining that, in an second entry for the second entity in the parent database table, the second particular type is specified in the class field of the second entry;
- in response to determining that the second particular type is specified in the class field, obtaining the second type-specific information from a child database table of one or more child database tables of the parent database table, wherein the child database table is associated with the second particular type; and
- providing the second type-specific information in response to the second request.

15. The non-transitory computer-readable storage medium of claim 14, wherein the entity is a first user and the second entity is a second user, and wherein the type-specific information and the second type-specific information each relate to one or more of logging on to a system, permissions to access specific units of data in memory, or presentation of material on a graphical user interface.

16. The non-transitory computer-readable storage medium of claim 14, wherein obtaining the second type-specific information comprises reading, from fields of a further entry for the second entity in the child database table, the second type-specific information.

17. The non-transitory computer-readable storage medium of claim 14, the operations further comprising:
- receiving a further request to write further type-specific information of the second particular type for the second entity;
- determining that, in the second entry in the parent database table, the second particular type is specified in the class field; and
- writing, to the child database table, the further type-specific information.

18. The non-transitory computer-readable storage medium of claim 13:
- receiving a further request to write further type-specific information of the particular type for the entity;
- determining that, in the entry in the parent database table, the particular type is indicated as present by the type-specific filter field that is associated with the particular type; and
- writing, to the parent database table, the further type-specific information.

* * * * *